(12) United States Patent
Katayama et al.

(10) Patent No.: US 10,082,974 B2
(45) Date of Patent: *Sep. 25, 2018

(54) INFORMATION PROCESSING SYSTEM, WIRELESS COMMUNICATION APPARATUS, METHOD AND PROGRAM

(71) Applicant: INTERNATIONAL BUSINESS MACHINES CORPORATION, Armonk, NY (US)

(72) Inventors: Yasunao Katayama, Kawasaki (JP); Daiju Nakano, Kawasaki (JP); Kohji Takano, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/924,774

(22) Filed: Oct. 28, 2015

(65) Prior Publication Data

US 2016/0231956 A1 Aug. 11, 2016

(30) Foreign Application Priority Data

Nov. 28, 2014 (JP) ................................. 2014-240843

(51) Int. Cl.
*H04L 29/06* (2006.01)
*G06F 3/06* (2006.01)
(Continued)

(52) U.S. Cl.
CPC ............ *G06F 3/0623* (2013.01); *G06F 3/065* (2013.01); *G06F 3/0619* (2013.01);
(Continued)

(58) Field of Classification Search
CPC ... H04W 24/04; H04W 76/06; H04W 76/028; H04W 76/045; H04W 67/327; H04L 65/4092

See application file for complete search history.

(56) References Cited

U.S. PATENT DOCUMENTS

| 6,748,403 | B1 | 6/2004 | Lemke | |
| 2015/0289132 | A1* | 10/2015 | Zhang | H04W 8/18 726/2 |
| 2015/0312949 | A1* | 10/2015 | Sugaya | H04W 76/021 370/329 |

FOREIGN PATENT DOCUMENTS

| JP | H10105663 | 4/1998 |
| JP | 2003018652 A | 1/2003 |

(Continued)

OTHER PUBLICATIONS

List of IBM Patents or Patent Applictions Treated As Related; (Appendix P), Filed Feb. 1, 2016, 2 pages.

(Continued)

*Primary Examiner* — Kim T Nguyen
(74) *Attorney, Agent, or Firm* — Cantor Colburn LLP

(57) ABSTRACT

Embodiments include providing content requested by a user via an access point capable of wireless communication. Aspects include receiving the content provided by the management server and storing the content provided by the management server into a volatile memory provided in the wireless communication apparatus. Aspects also include storing difference data into a nonvolatile memory if it is requested to change the content stored in the volatile memory and monitoring a state of communication connection with the access point and whether or not a packet giving an instruction to hold the content has been received. Aspects further include deleting the content stored in the volatile (Continued)

memory if communication with the access point is disconnected or if the packet is unreceived.

9 Claims, 10 Drawing Sheets

(51) Int. Cl.
*H04L 29/08* (2006.01)
*H04W 24/04* (2009.01)
*H04W 76/25* (2018.01)
*H04W 76/19* (2018.01)

(52) U.S. Cl.
CPC .......... *G06F 3/0652* (2013.01); *G06F 3/0685* (2013.01); *H04L 65/4092* (2013.01); *H04L 67/327* (2013.01); *H04W 24/04* (2013.01); *H04W 76/25* (2018.02); *H04W 76/19* (2018.02)

(56) References Cited

FOREIGN PATENT DOCUMENTS

| JP | 2003141078 A | 5/2003 |
| JP | 2003223368 A | 8/2003 |
| JP | 2005346827 A | 12/2005 |
| JP | 2007102688 A | 4/2007 |
| JP | 2008065677 A | 3/2008 |
| JP | 2009031938 A | 2/2009 |
| JP | 2009151726 A | 7/2009 |
| JP | 2009159405 A | 7/2009 |
| JP | 2009181458 A | 8/2009 |
| JP | 2009181460 A | 8/2009 |
| JP | 2012168688 A | 9/2012 |
| JP | 2013206097 A | 10/2013 |

OTHER PUBLICATIONS

Yasunao Katayama, et al., Pending U.S. Appl. No. 14/969,337 entitled "Information Processing System, Wireless Communication Apparatus, Method and Program," filed Dec. 15, 2015.

\* cited by examiner

[Figure 1]
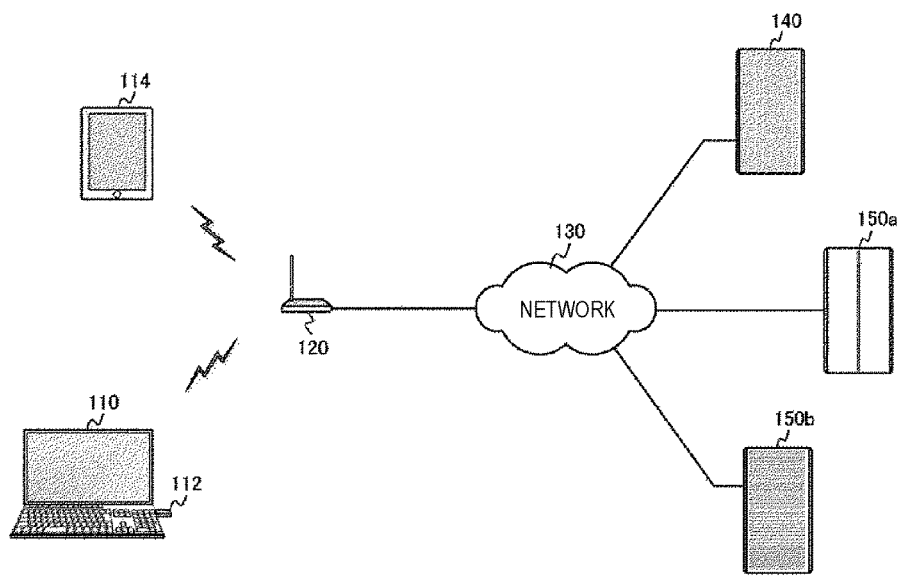

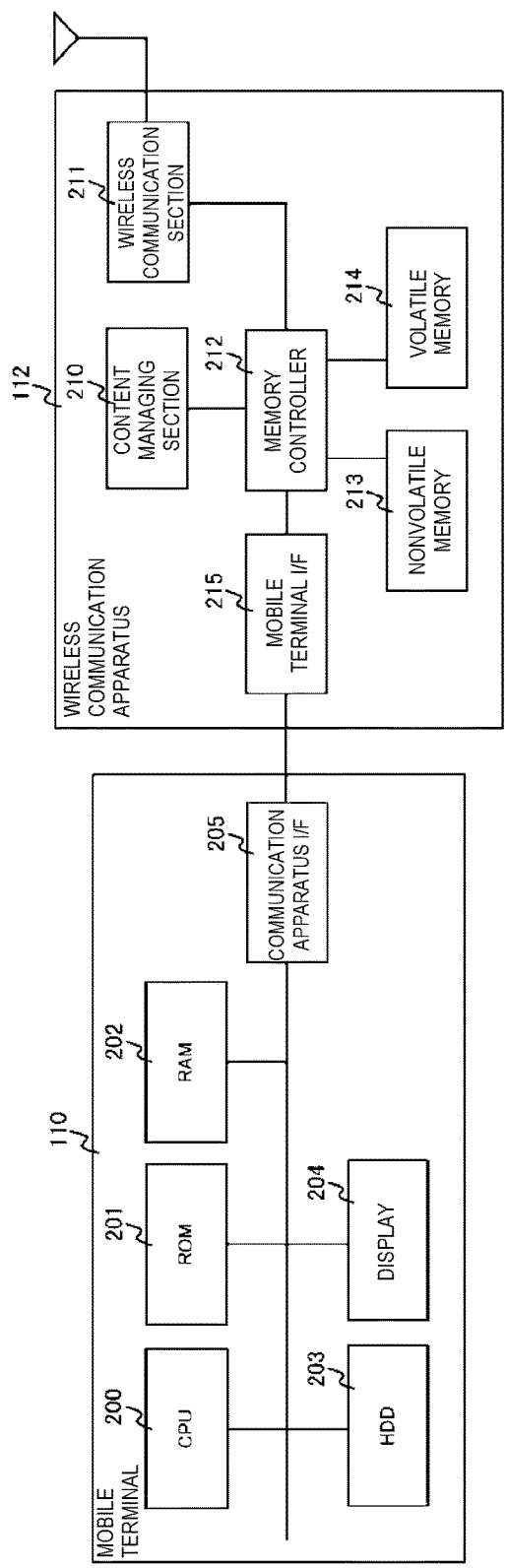
[Figure 2]

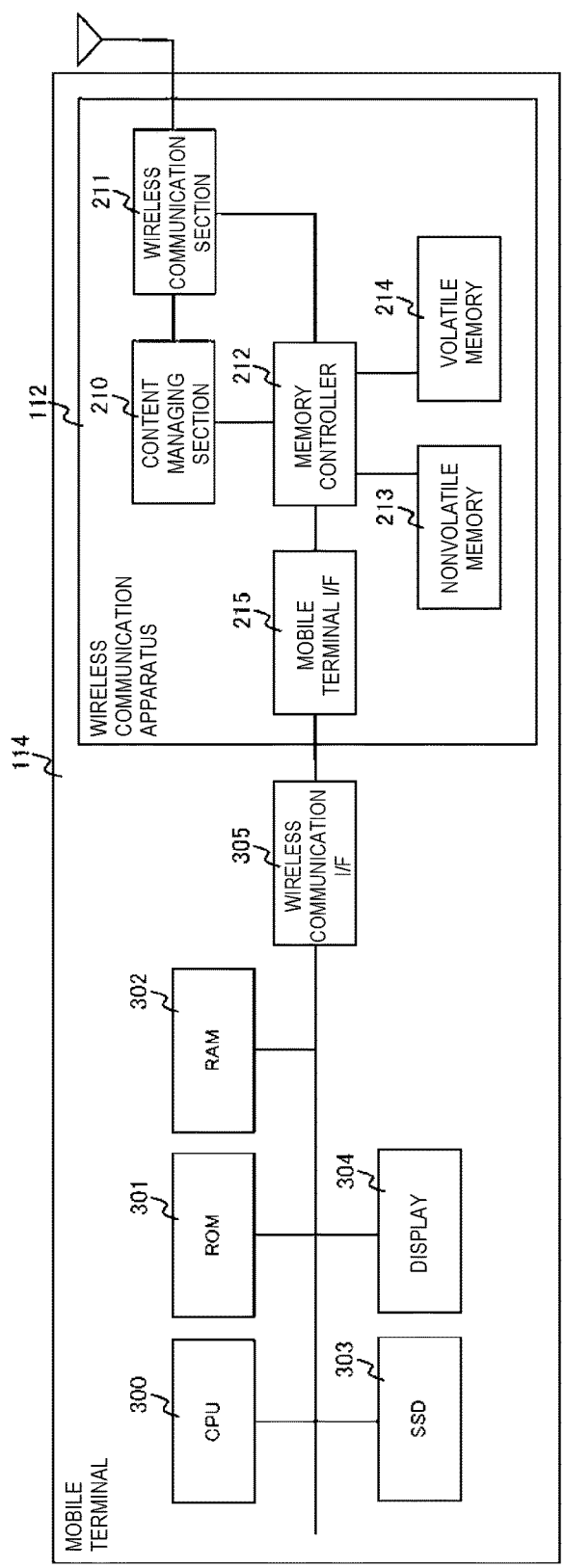
[Figure 3]

[Figure 4]
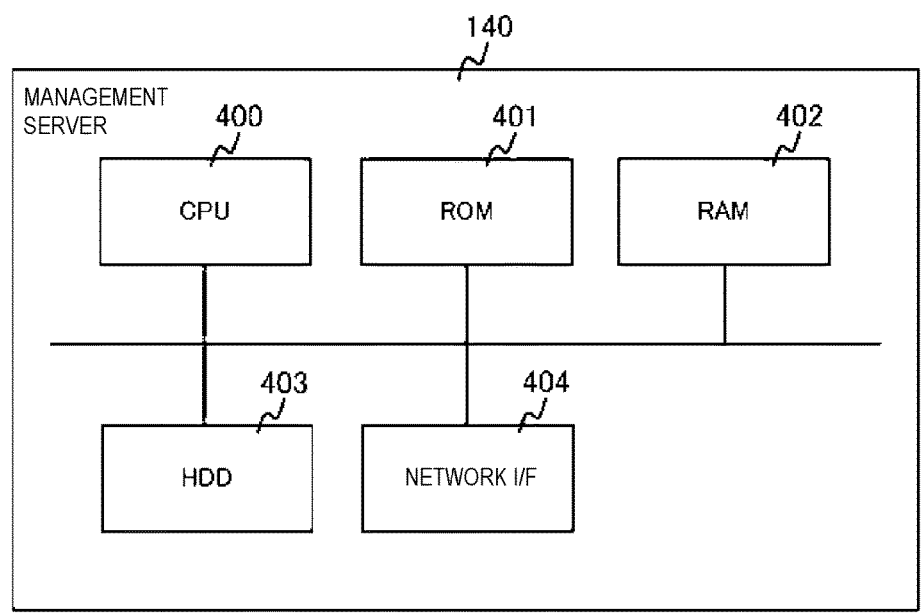

[Figure 5]
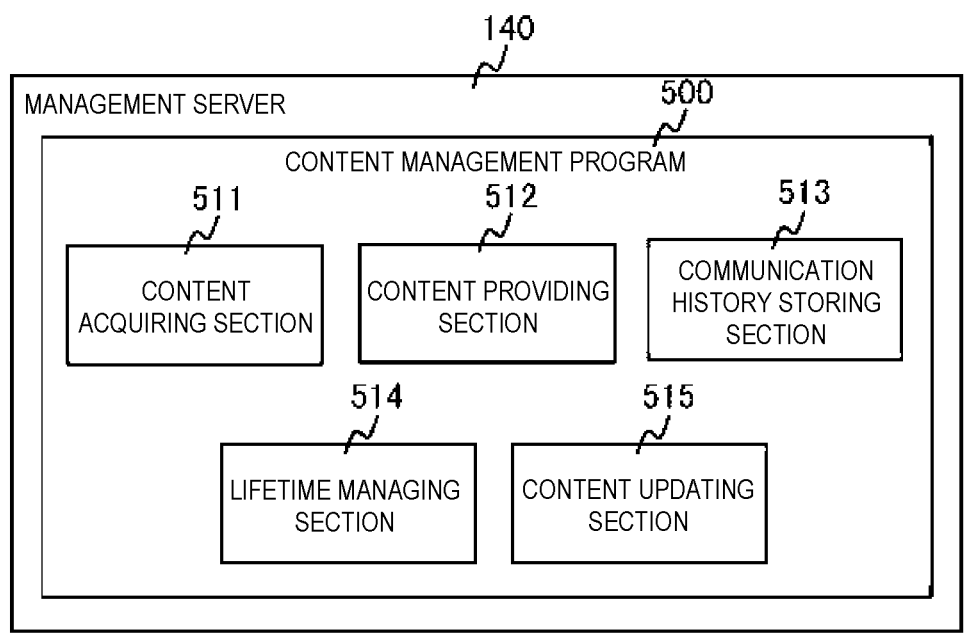

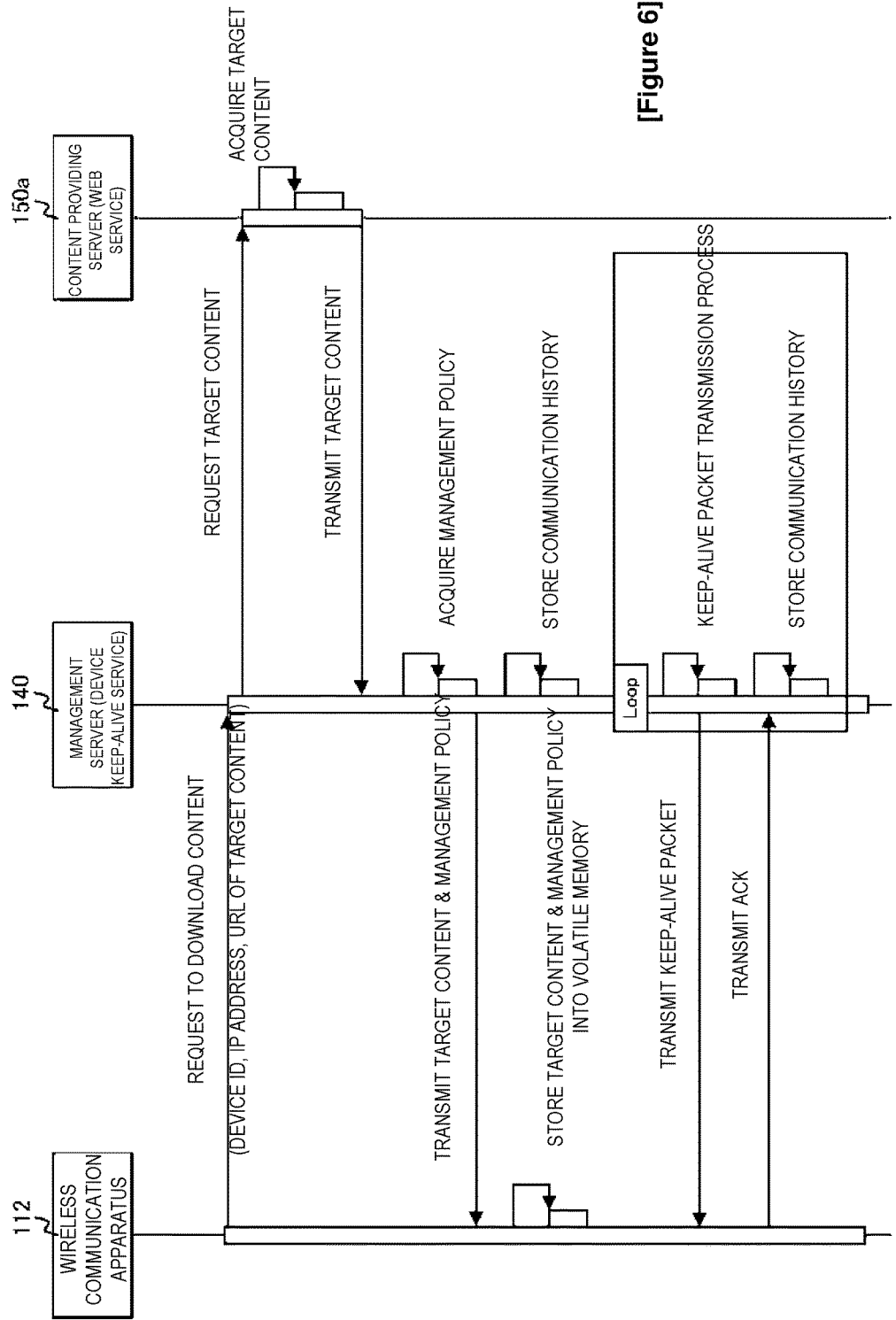
[Figure 6]

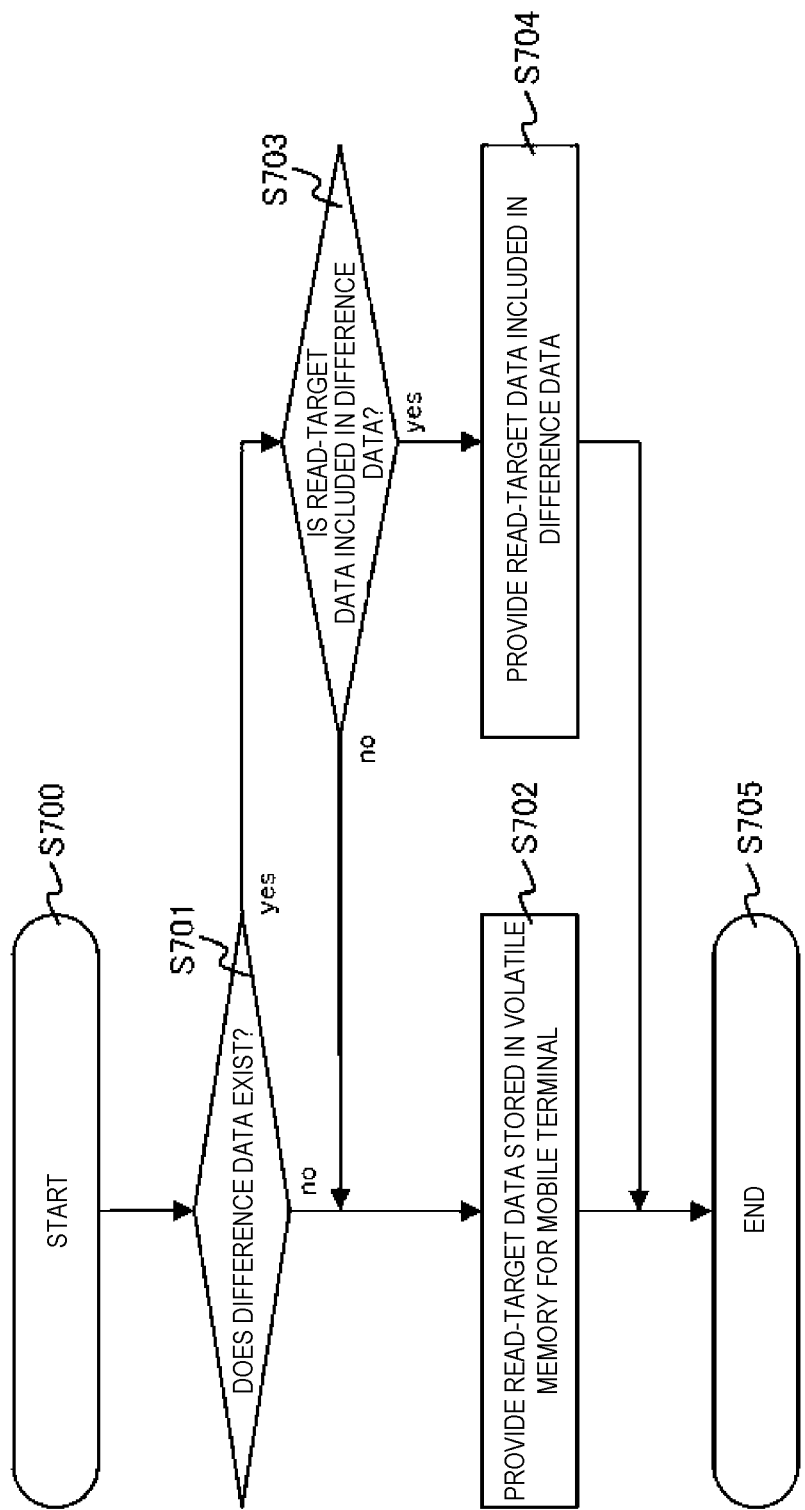
[Figure 7]

[Figure 8]
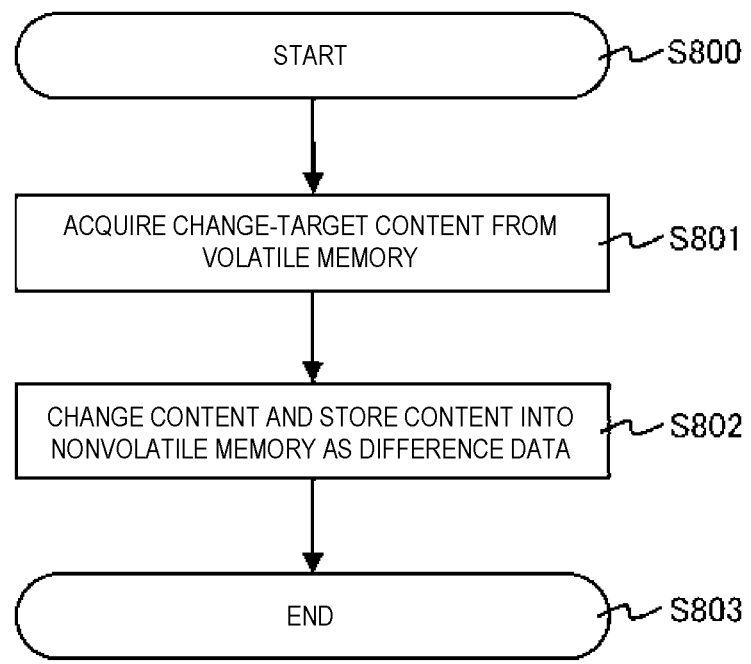

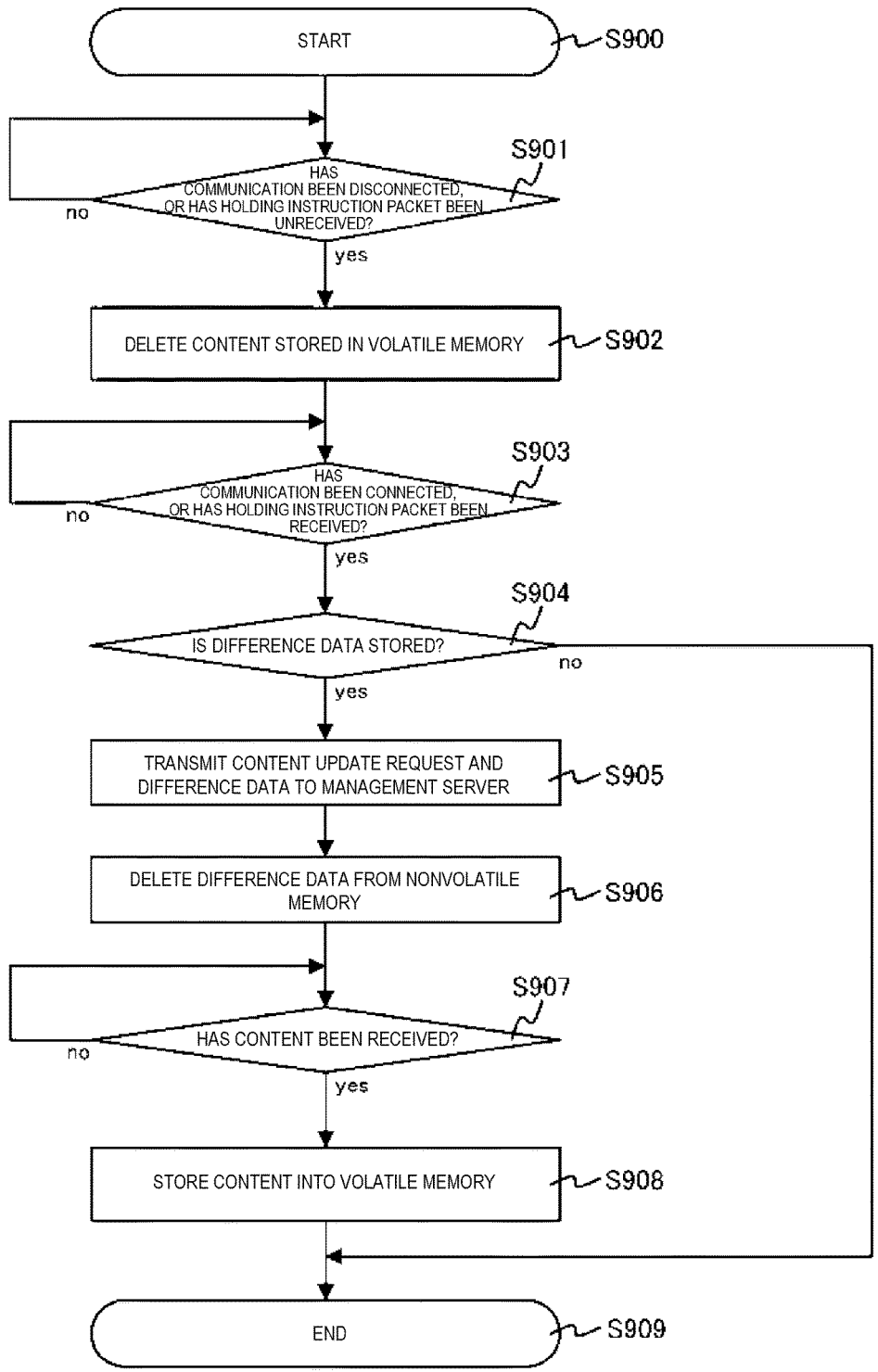
[Figure 9]

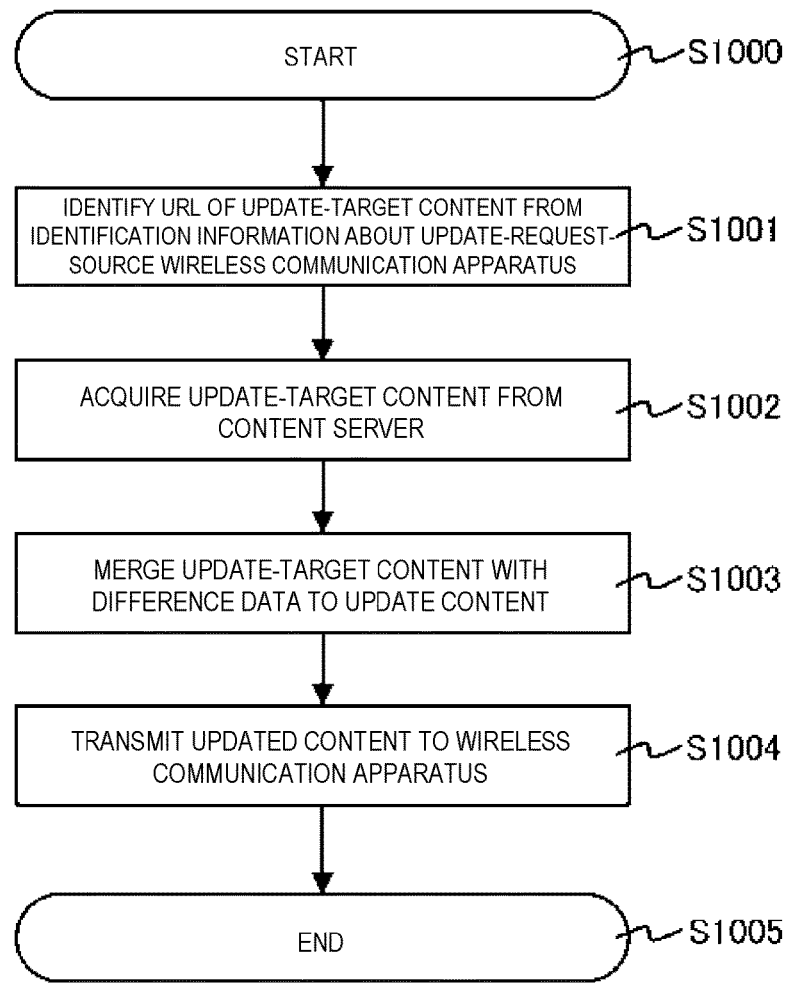
[Figure 10]

INFORMATION PROCESSING SYSTEM, WIRELESS COMMUNICATION APPARATUS, METHOD AND PROGRAM

FOREIGN PRIORITY

This application claims priority to Japanese Patent Application No. 2014-240843; filed Nov. 28, 2014, and all the benefits accruing therefrom under 35 U.S.C. § 119, the contents of which in its entirety are herein incorporated by reference.

BACKGROUND

The present invention relates to a high-speed wireless communication technique for mobile terminals, and more particularly to an information processing system, a wireless communication apparatus, a method, and a program that achieve high-speed wireless communication and manage content downloaded from a cloud to the mobile terminal side.

Wireless communication techniques such as Wifi®, Bluetooth® and LTE are important techniques supporting our life, and development of higher-speed wireless communication techniques is actively performed. As such a high-speed wireless communication technique, for example, a wireless communication technique using electromagnetic waves at frequencies of 60 GHz band (that is, a millimeter-wave band) exists. In wireless communication using a millimeter-wave band, super-high-speed data communication in multi-gigabits is possible. Data communication using a terahertz-wave band, which is electromagnetic waves of a higher frequency, is also possible. On the other hand, in the case of applying wireless communication at such a high frequency band to a mobile terminal, the following problem is conceivable.

Since the data transfer speed of a system bus and a storage device in a mobile terminal is slower than the wireless communication speed using a high frequency band, there is a high possibility that congestion occurs, and the efficiency of frequency utilization decreases. Further, in wireless communication using a high frequency band, the wavelength is short, and the straightness is very high. Therefore, there is a high possibility that communication between the mobile terminal and an access point is disconnected due to influence by a temporary obstacle such as a person crossing a wireless link. Therefore, there is a problem that, if content cached in a volatile memory such as the main memory of the mobile terminal is changed in a state that communication between the mobile terminal and the access point is disconnected, the changed data on the volatile memory is lost when the mobile terminal is powered off.

SUMMARY

An information processing system of the present invention includes a wireless communication apparatus, an access point capable of performing wireless communication with the wireless communication apparatus, and a management server for providing content requested by a user for the wireless communication apparatus or managing the lifetime of the content. The management server provides the content requested by the user for the wireless communication apparatus, and transmits a packet giving an instruction to hold the content to manage the lifetime of the content provided for the wireless communication apparatus. The wireless communication apparatus requests the content requested by the user from the management server, and stores the content provided by the management server into a volatile memory. The wireless communication apparatus stores difference data into a nonvolatile memory if it is requested to change the content, and deletes the content stored in the volatile memory if communication with the access point is disconnected or if the packet is unreceived.

BRIEF DESCRIPTION OF DRAWINGS

Through the more detailed description of some embodiments of the present disclosure in the accompanying drawings, the above and other objects, features and advantages of the present disclosure will become more apparent, wherein:

FIG. 1 is a diagram showing an embodiment of an information processing system of the present invention;

FIG. 2 is a diagram showing hardware configurations of a mobile terminal and a wireless communication apparatus in accordance with an exemplary embodiment;

FIG. 3 is a diagram showing a hardware configuration of a mobile terminal in accordance with an exemplary embodiment;

FIG. 4 is a diagram showing a hardware configuration of a management server in accordance with an exemplary embodiment;

FIG. 5 is a diagram showing a functional configuration of a content management program executed by the management server in accordance with an exemplary embodiment;

FIG. 6 is a sequence diagram showing an embodiment of a process executed by an information processing system in accordance with an exemplary embodiment;

FIG. 7 is a flowchart showing an embodiment of a process executed by the wireless communication apparatus in accordance with an exemplary embodiment;

FIG. 8 is a flowchart showing another embodiment of the process executed by the wireless communication apparatus in accordance with an exemplary embodiment;

FIG. 9 is a flowchart showing still another embodiment of the process executed by the wireless communication apparatus in accordance with an exemplary embodiment; and FIG. 10 is a flowchart showing an embodiment of a process executed by the management server in accordance with an exemplary embodiment.

DETAILED DESCRIPTION

By adopting the above configuration, the present invention is capable of preventing wireless communication speed from being restricted by hardware and software of a mobile terminal, preventing changed content stored in the mobile terminal from being lost even when communication connection between the mobile terminal and an access point is disconnected, and, further, enabling the lifetime of content downloaded to the mobile terminal to be managed on a cloud side or on a wireless communication apparatus.

FIG. 1 is a diagram showing an embodiment of an information processing system of the present invention. An information processing system 100 includes mobile terminals 110, 114, an access point 120, a management server 140, and content providing servers 150a, 150b. The management server 140 and the content providing servers 150a, 150b can be configured as physical servers or virtual servers on a cloud. The access point 120, the management server 140 and the content providing servers 150a, 150b are connected to a network 130 configured such that it includes the Internet, LANs and the like. The mobile terminals 110, 114 are connected to the network 130 via the access point 120. Data communication between the mobile terminals 110, 114 and the access point 120 is performed by wireless communication using a high frequency band such as a millimeter-wave band and a terahertz-wave band.

The mobile terminal 110 is a portable information processing apparatus capable of wireless communication using a high frequency band. In the embodiment shown in FIG. 1, a notebook PC to which a network interface card (NIC) can be connected is adopted as the mobile terminal 110, and a NIC-type wireless communication apparatus 112 capable of wireless communication using a high frequency band is connected to the mobile terminal 110. In another embodiment, a wireless communication apparatus capable of USB connection may be adopted as the wireless communication apparatus 112. The mobile terminal 114 is a portable information processing apparatus capable of wireless communication using a high frequency band. In the embodiment shown in FIG. 1, a tablet PC in which a wireless communication apparatus (not shown) capable of wireless communication using a high frequency band is incorporated is adopted as the mobile terminal 114.

The access point 120 is a relay apparatus that relays data communicated between the mobile terminals 110, 114 and the network 130. The access point 120 performs data communication with the mobile terminals 110, 114 by wireless communication using a high frequency band. In the embodiment shown in FIG. 1, the access point 120 is wire-connected to the network 130. In another embodiment, however, data communication between the access point 120 and the network 130 may be configured as wireless communication using a high frequency band.

The management server 140 is an information processing apparatus that manages provision of content held by the content providing servers 150a, 150b for the wireless communication apparatus 112 as well as managing the lifetime of the content provided for the wireless communication apparatus 112.

The content providing servers 150a, 150b are information processing apparatuses that hold digital data requested by users of the mobile terminals 110, 114. The content held by the content providing servers 150a, 150b includes, for example, various kinds of digital data such as client information, data for presentation and application software. In response to a request by the management server 140, the content providing servers 150a, 150b transmit content specified by the users of the mobile terminals 110, 114 to the management server 140.

FIG. 2 is a diagram showing an embodiment of hardware configurations of the mobile terminal 110 and the wireless communication apparatus 112 connected to the mobile terminal 110. The hardware configurations of the mobile terminal 110 and the wireless communication apparatus 112 will be described below with reference to FIG. 2. The mobile terminal 110 is provided with a CPU 200, a ROM 201, a RAM 202, a hard disk device (HDD) 203, a display 204, and a communication apparatus interface (I/F) 205.

The CPU 200 is an arithmetic processing unit that controls the operation of the mobile terminal 110. The ROM 201 is a nonvolatile memory in which data such as a boot program is stored. The RAM 202 is a volatile memory that provides an execution space for a program to be executed by the CPU 200. The HDD 203 is a nonvolatile bulk memory in which various programs, such as an OS and applications, and data are stored. The display 204 is a display device that displays content provided by the content providing servers 150a, 150b and various GUIs. The communication apparatus interface (I/F) 205 is a hardware interface that enables data communication with the wireless communication apparatus 112.

The wireless communication apparatus 112 is provided with a content managing section 210, a wireless communication section 211, a memory controller 212, a nonvolatile memory 213, a volatile memory 214 and a mobile terminal I/F 215. The content managing section 210, the wireless communication section 211 and the memory controller 212 can be realized by semiconductor integrated circuits such as ASICs.

The content managing section 210 is means for managing content provided by the management server 140. The content managing section 210 is provided with request means for requesting content requested by a user from the management server 140; monitoring means for monitoring a state of communication connection with the access point 120 and whether or not a packet has been received; and difference data providing means for providing difference data stored in the nonvolatile memory 213 for the management server 140 if communication with the access point 120 is connected again after communication with the access point 120 is disconnected. The difference data will be described later with reference to FIG. 8.

The wireless communication section 211 is means for performing data communication with the access point 120 using a high frequency band. The memory controller 212 is means for controlling the nonvolatile memory 213 and the volatile memory 214 in response to a request by the content managing section 210, the wireless communication section 211 or the mobile terminal 110. The nonvolatile memory 213 is a nonvolatile storage device such as a PROM, an EPROM and an EEPROM. The volatile memory 214 is a volatile storage device such as a DRAM and an SRAM. The mobile terminal I/F 215 is a hardware interface that performs data communication with the mobile terminal 110.

FIG. 3 is a diagram showing an embodiment of hardware configurations of the mobile terminal 114 and the wireless communication apparatus 112 incorporated in the mobile terminal 114. The hardware configurations of the mobile terminal 114 and the wireless communication apparatus 112 shown in FIG. 3 are the same as the hardware configurations described with reference to FIG. 2 except for a point that the wireless communication apparatus 112 is incorporated in the mobile terminal 114.

FIG. 4 is a diagram showing an embodiment of a hardware configuration of the management server 140. The hardware configuration of the management server 140 will be described below with reference to FIG. 4. The management server 140 is provided with a CPU 400, a ROM 401, a RAM 402, an HDD 403 and a network I/F 404. The CPU 400 is an arithmetic processing unit that controls the operation of the management server 140. The ROM 401 is a nonvolatile memory in which data such as a boot program is stored. The RAM 402 is a volatile memory that provides an execution space for a program to be executed by the CPU 400. The HDD 403 is a nonvolatile bulk memory in which various programs, such as an OS and applications, and data are stored. The network I/F 404 is a hardware interface that enables data communication with the network 130. The management server 140 realizes a function to be described later by the CPU 400 reading out a program of the present invention written in any of various kinds of program languages from the HDD 403 and developing the program in the RAM 402 to execute it under the control of the OS.

FIG. 5 is a diagram showing a functional configuration of the management server 140. The functional configuration of the management server 140 will be described below with reference to FIG. 5. The management server 140 executes a content management program 500 for managing content provided for the wireless communication apparatus 112. The content management program 500 includes a content acquiring section 511, a content providing section 512, a communication history storing section 513, a lifetime managing section 514, and a content updating section 515.

The content acquiring section 511 is means for acquiring content requested by the users of the mobile terminals 110, 114 from the content providing servers 150a, 150b. The content providing section 512 is means for providing the content acquired from the content providing servers 150a, 150b for the wireless communication apparatus 112. The communication history storing section 513 is means for storing communication history information about the wireless communication apparatus 112.

The lifetime managing section 514 is means for managing the lifetime of the content provided for the wireless communication apparatus 112. The lifetime managing section 514 transmits a holding instruction packet (Keep-alive packet) giving an instruction to hold the content, to the wireless communication apparatus 112 for which the content has been provided. In the case of deleting the content provided for the wireless communication apparatus 112 from the wireless communication apparatus 112, the lifetime managing section 514 stops transmission of the holding instruction packet.

The content updating section 515 is means for updating content in response to a content update request. The content updating section 515 updates the content provided by the wireless communication apparatus 112 using difference data of the content provided by the wireless communication apparatus 112.

FIG. 6 is a sequence diagram showing an embodiment of a process executed by the information processing system 100. A process executed when the user of the mobile terminal 110 requests download of content of the content providing server 150a will be described below with reference to FIG. 6.

When the user operates the mobile terminal 110 to give an instruction to download target content, the wireless communication apparatus 112 transmits a content download request to the management server 140 via the access point 120 and the network 130. At this time, the wireless communication apparatus 112 transmits identification information (a device ID) about the wireless communication apparatus 112, IP addresses assigned to the mobile terminal 110 and the wireless communication apparatus 112, and a URL specifying the target content together with the download request.

When the management server 140 receives the content download request from the wireless communication apparatus 112, the content acquiring section 511 identifies the content providing server 150a that provides the target content, from the URL of the target content, and requests the target content from the content providing server 150a. When receiving the content request from the wireless communication apparatus 112, the content providing server 150a transmits the target content to the management server 140.

When the management server 140 receives the target content from the content providing server 150a, the content providing section 512 acquires a management policy associated with the URL of the target content from a storage device of the management server 140, and transmits the target content and the management policy to the wireless communication apparatus 112. Then, the communication history storing section 513 stores the device ID, the IP addresses and the URL of the target content transmitted by the wireless communication apparatus 112 into the storage device as a communication history in association with one another.

When receiving the target content and the management policy from the management server 140, the wireless communication apparatus 112 stores them into the volatile memory 214 of the wireless communication apparatus 112. Thereby, when the wireless communication apparatus 112 is powered off, the content stored in the volatile memory 214 disappears. Therefore, it is possible to delete the content without depending on software of the mobile terminal 110, and it is possible to prevent leakage of secret information included in the content. In the present embodiment, content downloaded from the management server 140 is stored into the volatile memory 214 of the wireless communication apparatus 112. In another embodiment, however, the content downloaded from the management server 140 may be stored into the volatile memory of the mobile terminal 110.

Then, the lifetime managing section 514 of the management server 140 transmits a holding instruction packet (Keep-alive packet) to the wireless communication apparatus 112, and the communication history storing section 513 stores the transmission time of the holding instruction packet into the storage device as a communication history. To the holding instruction packet, information identifying the transmission destination of the packet (for example, a device ID, an IP address or the like) is added.

When receiving the holding instruction packet from the management server 140, the wireless communication apparatus 112 transmits a response (ACK) to the management server 140. When the management server 140 receives the response (ACK) from the wireless communication apparatus 112, the communication history storing section 513 stores the reception time of the response (ACK) into the storage device as a communication history.

In the present embodiment, the management server 140 repeatedly executes the process of transmitting the holding instruction packet while the response (ACK) is transmitted from the wireless communication apparatus 112. In another embodiment, the management server 140 may transmit the holding instruction packet only during a predetermined fixed time. Further, the management server 140 can perform the holding instruction packet transmission process described above at a predetermined frequency. Furthermore, in another embodiment, the wireless communication apparatus 112 may not transmit the response (ACK) to the management server 140.

FIG. 7 is a flowchart showing an embodiment of a process executed by the wireless communication apparatus 112. A process executed by the wireless communication apparatus 112 when it is requested by the mobile terminal 110 to read content stored in the volatile memory 214 of the wireless communication apparatus 112 will be described below with reference to FIG. 7. The process in FIG. 7 starts at block S700. As shown at block S701, the memory controller 212 determines whether or not difference data of the content, including the read-target data, is stored in the nonvolatile memory 213. If the difference data is not stored in the nonvolatile memory 213 (no), the process branches to block S702.

As shown at block S702, the memory controller 212 acquires the read-target data from the content stored in the volatile memory 214 and provides the read-target data for the mobile terminal 110. As shown at block S705, the process ends. The read-target data provided for the mobile terminal 110 is stored into the volatile memory of the mobile terminal 110 and is not stored into the nonvolatile memory.

On the other hand, if the difference data is stored in the nonvolatile memory 213 (yes), the process branches to block S703. As shown at block S703, the memory controller 212 determines whether or not the read-target data is included in the difference data. If the read-target data is not included in the difference data (no), the process branches to block S702.

On the other hand, if the read-target data is included in the difference data (yes), the process branches to block S704. As shown at block S704, the memory controller 212 acquires the read-target data included in the difference data from the nonvolatile memory 213 and provides the read-target data for the mobile terminal 110. As shown at block S705, the process ends.

FIG. 8 is a flowchart showing another embodiment of the process executed by the wireless communication apparatus 112. A process executed by the wireless communication apparatus 112 when it is requested by the mobile terminal 110 to change content stored in the volatile memory 214 of the wireless communication apparatus 112 will be described below with reference to FIG. 8. The process in FIG. 8 starts at block S800. As shown at block S801, the memory controller 212 acquires change-target content from the volatile memory 214. As shown at block S802, the memory controller 212 changes a data part in the change-target content requested by the user to be changed, and stores the changed data into the nonvolatile memory 213 as difference data. As shown at block S803, the process ends. Thereby, even if the mobile terminal 110 or the wireless communication apparatus 112 is powered off, disappearance of the difference data can be prevented.

In the present embodiment, the memory controller 212 can store difference data in sectors. In another embodiment, the difference data in an arbitrary unit may be stored together with information enabling identification of the position of the difference data in the content.

FIG. 9 is a flowchart showing still another embodiment of the process executed by the wireless communication apparatus 112. A process executed by the wireless communication apparatus 112 when communication between the wireless communication apparatus 112 and the access point 120 is disconnected or when the wireless communication apparatus 112 does not receive a holding instruction packet will be described below with reference to FIG. 9. The process in FIG. 9 starts at block S900. As shown at block S901, the content managing section 210 monitors whether or not communication between the wireless communication apparatus 112 and the access point 120 has been disconnected or whether or not a holding instruction packet has been unreceived.

In the present embodiment, the content managing section 210 can determines that communication with the access point 120 has been disconnected if a response from the access point 120 is not received within a time prescribed by a management policy. Further, the content managing section 210 can determines that a holding instruction packet has been unreceived if the holding instruction packet is not received within a time prescribed by a management policy.

If communication between the wireless communication apparatus 112 and the access point 120 has not been disconnected or if a holding instruction packet has been received (no), the process of block S901 is repeatedly executed. On the other hand, if communication between the wireless communication apparatus 112 and the access point 120 has been disconnected or if a holding instruction packet has been unreceived (yes), the process branches to block S902.

As shown at block S902, the content managing section 210 causes the memory controller 212 to delete content stored in the volatile memory 214. Thereby, when the wireless communication apparatus 112 goes outside the communication area of the access point 120, content stored in the wireless communication apparatus 112 can be immediately deleted. Therefore, it is possible to restrict a user to viewing content with a mobile terminal only in a local area and prevent leakage of secret information.

Further, as described above, if the wireless communication apparatus 112 has not received a holding instruction packet, the wireless communication apparatus 112 deletes content downloaded from the management server 140. Therefore, the management server 140 can control the lifetime of content that has been already downloaded to the wireless communication apparatus 112, from the cloud side by stopping transmission of a holding instruction packet, and it is possible to prevent leakage of secret information.

As shown at block S903, the content managing section 210 determines whether or not communication between the wireless communication apparatus 112 and the access point 120 has been connected or whether or not a holding instruction packet has been received. If communication between the wireless communication apparatus 112 and the access point 120 has not been connected or if a holding instruction packet has not been received (no), the process of block S903 is repeatedly executed. On the other hand, if communication between the wireless communication apparatus 112 and the access point 120 has been connected or if a holding instruction packet has been received (yes), the process branches to block S904.

As shown at block S904, the content managing section 210 determines whether or not difference data is stored in the nonvolatile memory 213. If the difference data is not stored in the nonvolatile memory 213 (no), the process ends at block S909. On the other hand, if the difference data is stored in the nonvolatile memory 213 (yes), the process branches to block S905.

As shown at block S905, the content managing section 210 acquires the difference data from the nonvolatile memory 213 via the memory controller 212, and transmits the difference data to the management server 140 together with a content update request. To the content update request, identification information about the wireless communication apparatus 112 (for example, an IP address or a device ID) is added.

As shown at block S906, the content managing section 210 causes the memory controller 212 to delete the difference data stored in the nonvolatile memory 213. On the other hand, when receiving the difference data from the wireless communication apparatus 112, the management server 140 merges the content with the difference data to update the content, as shown at block S907, the content managing section 210 determines whether or not the content has been received from the management server 140. If the content has not been received from the management server 140 (no), the process of block S907 is repeatedly executed. On the other hand, if the content has been received from the management server 140 (yes), the process branches to block S908. As shown at block S908, the content managing section 210 causes the memory controller 212 to store the updated content received from the management server 140 into the volatile memory 214, and the process ends at block S909.

FIG. 10 is a flowchart showing an embodiment of a process executed by the management server 140. A process executed when a content update request is received from the wireless communication apparatus 112 will be described below with reference to FIG. 10.

The process in FIG. 10 starts at block S1000. As shown at block S1001, the content acquiring section 511 of the management server 140 refers to a communication history stored in the storage device of the management server 140 to identify the URL of content associated with identification information about a wireless communication apparatus added to the content update request. As shown at block S1002, from a content providing server indicated by the URL of the content, the content acquiring section 511 acquires the update-target content.

As shown at block S1003, the content updating section 515 merges the update-target content with difference data to update the content. As shown at block S1004, the content providing section 512 transmits the updated content to the wireless communication apparatus 112, and the process ends at block S1005.

In the present embodiment, the management server 140 acquires update-target content from a content providing server. In another embodiment, however, content that has been already acquired from a content providing server in the process in FIG. 6 is stored, and the content may be provided as update-target content.

The present embodiment has been described so far. The present invention, however, is not limited to the embodiment described above. Changes can be made within a range that one skilled in the art can think of, such as change or deletion of functional means of the embodiment and addition of other functional means. Any of the aspects is to be included within the scope of the present invention as far as the operation/advantageous effect of the present invention can be obtained.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An information processing system including a wireless communication apparatus, an access point capable of wireless communication with the wireless communication apparatus, and a management server for providing content requested by a user for the wireless communication apparatus or managing a lifetime of the content, wherein
the management server comprises:
a content providing section for providing the content requested by the user for the wireless communication apparatus; and
a lifetime managing section for transmitting a packet giving an instruction to hold the content to manage the lifetime of the content provided for the wireless communication apparatus; and
the wireless communication apparatus comprises:
a processor configured to request the content requested by the user from the management server;
a volatile memory for storing the content provided by the management server;
a memory controller for controlling a storage device; and
the processor further configured to monitor a state of communication connection with the access point and whether or not the packet has been received; wherein
the memory controller stores the content provided by the management server into the volatile memory, stores difference data into a nonvolatile memory if the memory controller is requested to change the content stored in the volatile memory, and deletes the content stored in the volatile memory if communication with the access point is disconnected or if the packet giving the instruction to hold the content is unreceived.

2. The information processing system according to claim 1, wherein
the wireless communication apparatus being configured to provide the difference data stored in the nonvolatile memory for the management server if communication with the access point is connected again after communication with the access point is disconnected;
the management server comprises a content updating section for updating the content using the difference data upon receiving the difference data from the wireless communication apparatus; and
the content providing section provides the updated content for the wireless communication apparatus.

3. A wireless communication apparatus communicable with a management server for providing content requested by a user or managing a lifetime of the content, via an access point capable of wireless communication, the wireless communication apparatus comprising:
a volatile memory for storing the content provided by the management server;
a memory controller for controlling a storage device; and
a processor configured to monitor a state of communication connection with the access point and whether or not a packet giving an instruction to hold the content has been received; wherein
the memory controller stores difference data into a nonvolatile memory if the memory controller is requested to change the content stored in the volatile memory, and deletes the content stored in the volatile memory if communication with the access point is disconnected or if the packet is unreceived.

4. The wireless communication apparatus according to claim 3, wherein the processor is further configured to provide the difference data stored in the nonvolatile memory for the management server if communication with the access point is connected again after communication with the access point is disconnected.

5. The wireless communication apparatus according to claim 3, performing wireless communication with the access point using a millimeter-wave band.

6. The wireless communication apparatus according to claim 3, performing wireless communication with the access point using a terahertz-wave band.

7. The wireless communication apparatus according to claim 3, being connectable to a mobile terminal and being an apparatus separate and independent from the mobile terminal.

8. The wireless communication apparatus according to claim 3, being able to be incorporated into a mobile terminal and being configured integrally with the mobile terminal.

9. The wireless communication apparatus according to claim 3, wherein the nonvolatile memory is a storage device provided in the wireless communication apparatus or a mobile terminal.

* * * * *